United States Patent [19]
Christie

[11] Patent Number: 5,213,280
[45] Date of Patent: May 25, 1993

[54] LINEAR PAYOUT LEADER HOLDER

[75] Inventor: Nancy J. Christie, Tucson, Ariz.

[73] Assignee: Hughes Aircraft Company, Los Angeles, Calif.

[21] Appl. No.: 669,243

[22] Filed: Mar. 14, 1991

[51] Int. Cl.$^5$ .............................................. F42B 15/04
[52] U.S. Cl. .................................... 244/3.12; 242/128
[58] Field of Search ........................ 244/3.12, 3.16; 242/118, 118.31, 128

[56] References Cited

U.S. PATENT DOCUMENTS

| | | | |
|---|---|---|---|
| 4,326,657 | 4/1982 | Arpin et al. | 242/128 |
| 4,860,968 | 8/1989 | Pinson | 244/3.12 |
| 4,903,607 | 2/1990 | Clark | 244/3.12 |
| 4,991,793 | 2/1991 | Beasley, et al. | 242/128 |
| 5,005,930 | 4/1991 | Schotter | 244/3.12 |
| 5,022,603 | 6/1991 | Maree et al. | 242/128 |
| 5,031,982 | 7/1991 | Redford | 242/128 |

FOREIGN PATENT DOCUMENTS

| | | | |
|---|---|---|---|
| 0404367 | 12/1990 | European Pat. Off. | |
| 0404485 | 12/1990 | European Pat. Off. | |
| 1258696 | 1/1968 | Fed. Rep. of Germany | 242/128 |
| 9005888 | 5/1990 | World Int. Prop. O. | |

*Primary Examiner*—Stephen M. Johnson
*Attorney, Agent, or Firm*—C. D. Brown; R. M. Heald; W. K. Denson-Low

[57] ABSTRACT

A linear optical fiber waveguide dispenser (10) comprising a linear payout leader holder (15) including an optical fiber waveguide having an unjacketed portion (16) and leader (17) comprising a coiled jacketed portion disposed within a housing (11). The housing (11) has an exit aperture (14) through which the jacketed fiber waveguide protrudes. A fiber optic connector (18) is connected onto the end of the jacketed portion of the waveguide. The linear dispenser (10) accommodates the leader (17) without having to increase the size of the payout helix generated thereby. The linear payout leader holder (15) may be used with a balloon assisted dispenser that has its helix sufficiently dampened to create a linear payout. It allows a strengthened leader (17) to be coiled inside the dispenser (10), an arrangement that would not normally fit into the exit of a conventional linear payout dispenser. Also, in situations where there is the need for the fiber to payout close to the dispenser (10), the linear payout leader holder (15) provides a smooth nonabrasive mechanism to accomplish this. Payouts with a helix as small as four fiber waveguide diameters are achievable using the present invention, and the waveguide is protected during the high stress payout initiation phase. A plurality of single pylon launchers (20a-20d) having dual payout capability are provided and incorporate a payout initiation system with the use of the present invention and a balloon assisted dispenser (10).

12 Claims, 1 Drawing Sheet

LINEAR PAYOUT LEADER HOLDER

BACKGROUND

The present invention relates generally to missile launchers, and more particularly, to a linear payout leader holder for use in deploying an optical fiber waveguide from such missile launchers.

In nonlinear waveguide payout systems, a leader is attached to a fiberpack that comprises an optical fiber waveguide wound around a bobbin. The transition from the leader to an unprotected fiber is accomplished in a manner consistent with the wound fiber. The leader lays on the fiberpack and creates no extra stress on the fiber/jacket transition point. This non-stress environment is not possible with conventional linear payout leader holders because the size of the dampening exit is too small to include a lightweight protective fiber jacketing around the waveguide. Previous linear payout systems had no stable area to put a protective leader. The fiber was left hanging outside the dispenser, creating a strain on the fiber at the point where the fiber was inserted into the jacketing.

In the case of dual payout systems, one proposed method for payout initiation has the optical fiber waveguide attached to the outside of the launcher dispenser with adhesive tape. In the case of a conventional fiber dispenser, it has a square corner that is located physically close to the optical fiber waveguide during deployment, and as a result creates undue stress on the waveguide.

Accordingly, it would be an advance in the waveguide deployment art to have a linear payout system that is useable in optical fiber payload deployment systems. It would also be advantageous to have a linear payout system that allows a strengthened leader to be coiled inside a leader housing to provide protection for the optical fiber waveguide during its deployment initiation. Also, where there is a need for the fiber to pay out close to the dispenser, or hug the dispenser prior to launch, there is a need for a deployment system that provides for a smooth, nonabrasive deployment mechanism.

SUMMARY OF THE INVENTION

In order to provide the above features and advantages, the present invention provides for a linear payout optical fiber waveguide leader holder for use with an optical fiber dispenser, that includes an optical fiber waveguide having an unjacketed portion and a coiled jacketed portion disposed within a housing. The housing has an exit aperture through which the jacketed fiber protrudes. A fiber optic connector is connected onto the end of the jacketed portion of the waveguide that is adapted to couple to a missile, or vehicle, for example. The present linear payout leader holder accommodates a relatively thick "fatjacketed" leader without having to increase the size of the payout helix.

The present invention has at least two particular applications. The linear payout leader holder attaches to a balloon assisted dispenser that has its helix sufficiently dampened to provide a linear payout. It allows a strengthened leader to be coiled inside the balloon assisted dispenser which eliminates strain on the fiber at the point where the fiber was inserted into the jacketing, and which provides for a smooth, nonabrasive fiber waveguide deployment. This is accomplished although the linear payout leader holder of the present invention would not normally fit into the exit of a conventional linear payout dispenser.

Furthermore, in situations where there is the need for the optical fiber waveguide to pay out close to the dispenser or hug the dispenser prior to launch, the linear payout leader holder provides for a smooth nonabrasive system that accomplishes this. The linear payout leader holder of the present invention provides for a more reliable linear payout system. Payouts having a helix as small as four fiber diameters are achievable using the present invention and the waveguide is protectable during the high stress payout initiation phase.

A plurality of single pylon launchers having dual payout capability are also provided using the principles of the present invention that combine a plurality of linear payout initiation systems incorporating the present invention in conjunction with a plurality of balloon assisted dispensers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
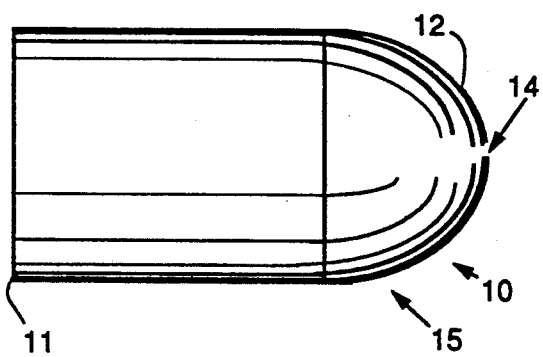
FIG. 1 illustrates an optical fiber dispenser incorporating a linear payout waveguide leader holder in accordance with the principles of the present invention.

Referring to the drawing figures, FIG. 1 illustrates a balloon assisted dispenser 10 incorporating a linear payout waveguide leader holder 15 in accordance with the principles of the present invention. Additional information and details concerning the balloon assisted dispenser can be found in U.S. patent application Ser. No. 07/556,235 filed Jul. 20, 1990, filed for inventor George Le Compte for Filament Dispenser, which is incorporated herein in its entirety by this reference. The balloon assisted dispenser 10 is shown having a shroud or housing 11, which typically has a cylindrical shape and a cone-shaped leader holder 12 that is secured to the housing 11. The cone-shaped leader holder 12 has an exit aperture 14 disposed in its distal end that is adapted to allow an optical fiber waveguide (shown in FIG. 2) to exit therefrom. The cone shaped leader-holder 12 attaches to the aft end of the housing 11 of the balloon assisted dispenser 10.

Figure 2:
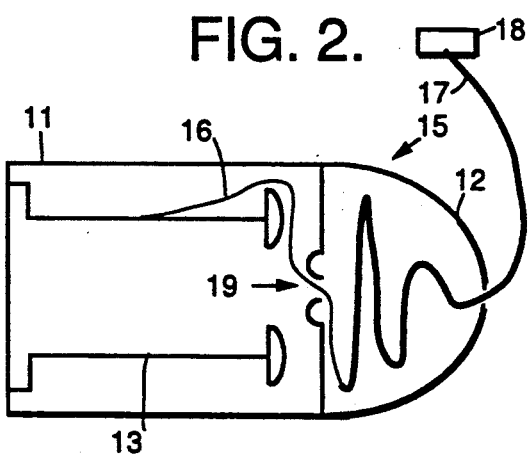
FIG. 2 illustrates the interior of the balloon assisted dispenser of FIG. 1.

With reference to FIG. 2, it illustrates the interior of the balloon assisted dispenser 10 of FIG. 1. An optical fiber waveguide having an unjacketed portion 16 and a leader 17 comprising coiled jacketed portion is disposed within the balloon assisted dispenser 10. The unjacketed portion 16 is wound around a bobbin 13 disposed in the housing 11 and passes through an interior aperture 19 having a smoothly rounded contour. The leader 17 is coiled inside and is generally disposed in contact with the inner wall of the cone-shaped leader holder 12. A connector 18 is coupled to the end of the optical fiber waveguide and is secured to the leader 17. The exit aperture 14 of the cone-shaped leader holder 12 is large enough to allow the connector 18 to pass therethrough.

In operation, the connector 18 is connected to a missile or vehicle (shown in FIGS. 3–6) and a portion of the leader 17 extends out of the end of the leader holder 15. When the missile, for example, is launched, the coiled jacketed portion of the leader 17 acts to protect the optical fiber waveguide during the initial payout phase, wherein the waveguide is apt to experience large acceleration forces. Once the missile is airborne, and flying along its desired trajectory, the forces exerted on the unjacketed portion 16 of the waveguide are relatively minimal. Using the present invention, a payout helix as small as four fiber waveguide diameters is achievable and the waveguide is protected during the high stress payout initiation phase.

FIGS. 3–6 illustrate four embodiments of single pylon launchers 20a–20d, each incorporating a dual payout initiation system 21a–21d in accordance with the principles of the present invention. The single pylon launchers 20a–20d are used in a missile launching system comprising a missile 22 and the launcher 20a–20d, and wherein the balloon assisted dispenser 10 of the present invention is disposed in or attached to both the missile 22 and the launcher 20a–20d of each system 21a–21d. The single pylon launchers 20a–20d incorporating the dual payout initiation system 21a–21d and the balloon assisted dispensers 10 comprise the following components and structural arrangement.

Figure 3:
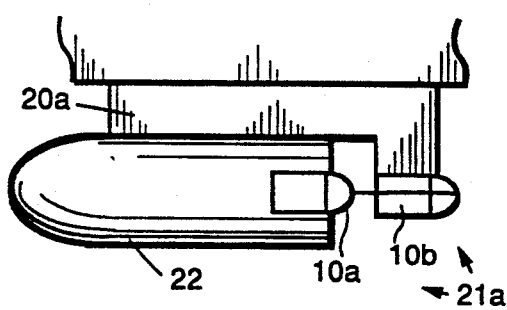
FIG. 3 illustrates a first embodiment of a single pylon launcher incorporating a dual payout leader holder in accordance with the principles of the present invention.

With reference to FIG. 3, the missile 22 comprises a first balloon assisted dispenser 10a, or fuse dispenser 10a, coupled to the aft end thereof, and the missile 22 is mounted in a first launcher 20a. The fuse dispenser 10a is attached to the missile 22 and is configured substantially as described with reference to FIGS. 1 and 2 above. A second balloon assisted dispenser 10b, or launcher dispenser 10b, is attached to the launcher 20a. The jacketed fiber optic waveguide of the fuse dispenser 10a extends out of the exit 14 and is attached along the side of the housing 11. The jacketed fiber optic waveguide of the launcher dispenser 10b extends out of the exit 14 and extends back along the side of the housing, and is attached thereto. The waveguide from the launcher dispenser 10b is connected to the waveguide of the fuse dispenser 10a via the optical connector 18. When the missile 22 is launched, the fiber optic waveguide attached to the housing 11 detaches therefrom and thus initiates deployment having the waveguide disposed in the air stream.

Figure 4:
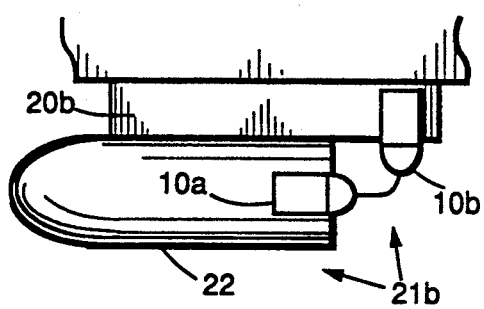
FIG. 4 illustrates a second embodiment of a single pylon launcher incorporating a dual payout leader holder in accordance with the principles of the present invention.
Figure 5:
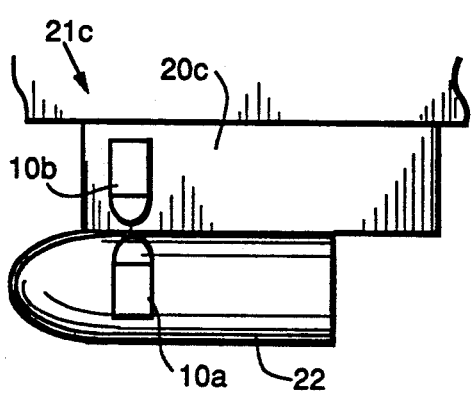
FIG. 5 illustrates a third embodiment of a single pylon launcher incorporating a dual payout leader holder in accordance with the principles of the present invention.
Figure 6:
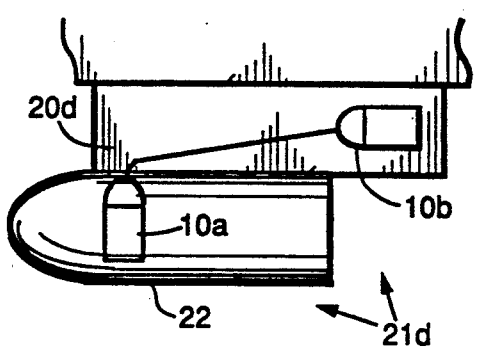
FIG. 6 illustrates a fourth embodiment of a single pylon launcher incorporating a dual payout leader holder in accordance with the principles of the present invention.

With reference to FIGS. 4–6, the arrangements of the fuse and launcher dispensers 10a, 10b are oriented such that their respective leader holders 15 are adjacent each other, as are clearly shown in the drawing figures. The deployment of the optical fiber waveguide from the fuse and launcher dispensers 10a, 10b of FIGS. 4–6 is accomplished in a manner described above with reference to the dispenser 10 of FIG. 2.

Each of the four single pylon launchers 20a–20d shown in FIGS. 3–6 incorporate the dual payout initiation system of the present invention and utilize the linear balloon assisted dispenser 10 generally described with reference to FIGS. 1 and 2. FIGS. 3 and 4 show dual payout arrangements where the optical fiber waveguide is deployed close to the dispenser 10 during deployment. FIG. 3 has the optical fiber waveguide attached to the dispenser 10 prior to payout initiation. The two arrangements shown in FIGS. 3 ad 4 have additional benefits due to the smooth outer surface the cone-shaped leader holder 12 of the balloon assisted dispenser 10.

More specifically, the single pylon launcher 20a of FIG. 3 has an L-shape and the launcher dispenser 10b is disposed adjacent the end of the L. The launcher dispenser 10b is oriented in a direction substantially parallel to the orientation of the missile 22. The fuse dispenser 10a is disposed in the aft end of the missile 22 adjacent the launcher dispenser 10b and is also oriented in a direction substantially parallel to the orientation of the missile 22.

In the single pylon launcher 20b shown in FIG. 4, the launcher dispenser 10b is disposed adjacent an aft end of the launcher 20b and is oriented generally orthogonal to the orientation of the missile 22. The fuse dispenser 10a is disposed in the aft end of the missile 22 adjacent the launcher dispenser 10b and is oriented in a direction substantially parallel to the orientation of the missile 22.

In the single pylon launcher 20c shown in FIG. 5, the launcher dispenser 10b is disposed at a forward end of the launcher 20c and is oriented orthogonal to the orientation of the missile 22. The fuse dispenser 10a is disposed in a forward end of the missile 22 proximate the launcher dispenser 10b and is oriented in a direction orthogonal to the orientation of the missile 22, and is generally aligned in a direction parallel to the launcher dispenser 10b.

In the single pylon launcher 20d shown in FIG. 6, the launcher dispenser 10b is disposed adjacent an aft end of the launcher 20d and is oriented in a direction generally parallel to the orientation of the missile 22. The fuse dispenser 10a is disposed in a forward end of the missile 22 and is oriented in a direction generally orthogonal to the orientation of the missile 22.

Thus there has been described new and improved balloon assisted dispensers incorporating a linear payout leader holder for use in missile launchers, and a plurality of single pylon launchers that incorporate a dual payout initiation system using the linear balloon assisted dispenser. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An optical fiber dispenser comprising:
   a housing;
   a bobbin disposed within the housing;
   a leader holder attached to an end of the housing;
   an exit aperture disposed in the leader holder that is adapted to allow an optical fiber waveguide to exit therefrom; and said optical fiber waveguide having an unjacketed portion wound around the bobbin and a leader comprising coiled jacketed portion coupled to the unjacketed portion of the optical fiber waveguide, and wherein the the leader is coiled inside and is disposed in contact with an inner wall of the leader holder.

2. The dispenser of claim 1 further comprising:
a connector coupled to an end of the coiled jacketed portion of the optical fiber waveguide; and
an exit aperture disposed in the leader holder that is large enough to permit the connector to pass therethrough.

3. An optical fiber balloon assisted dispenser comprising:
a cylindrical housing;
a bobbin disposed within the housing;
a cone-shaped leader holder attached to an end of the housing;
an interior aperture having a smoothly rounded contour disposed between the housing and the leader holder;
an exit aperture disposed in the leader holder that is adapted to allow an optical fiber waveguide to exit therefrom; and
said optical fiber waveguide having an unjacketed portion and a leader comprising coiled jacketed portion, and wherein the leader is disposed within the leader holder, and wherein the unjacketed portion is wound around the bobbin and passes through the interior aperture, and wherein the the leader is coiled inside and is disposed in contact with an inner wall of the leader holder.

4. The balloon assisted dispenser of claim 3 further comprising:
a connector coupled to an end of the coiled jacketed portion of the optical fiber waveguide; and
an exit aperture disposed in the cone-shaped leader holder that is large enough to permit the connector to pass therethrough.

5. In a missile launching system comprising a missile and a launcher, a dispenser for use in both the missile and in the launcher, which dispenser comprises:
a cylindrical housing;
a bobbin disposed within the housing;
a cone-shaped leader holder attached to an end of the housing;
an interior aperture having a smoothly rounded contour disposed between the housing and the leader holder;
an exit aperture disposed in the leader holder that is adapted to allow an optical fiber waveguide to exit therefrom; and
said optical fiber waveguide having an unjacketed portion and a leader comprising coiled jacketed portion, and wherein the leader is disposed within the leader holder, and wherein the unjacketed portion is wound around the bobbin and passes through the interior aperture, and wherein the the leader is coiled inside and is disposed in contact with an inner wall of the leader holder.

6. The missile launching system of claim 5 wherein the dispenser further comprises a connector attached to the optical fiber waveguide at a distal end of the jacketed portion thereof.

7. A single pylon launcher comprising:
a launcher,
a first balloon assisted dispenser coupled to the launcher comprising a first optical fiber waveguide having an unjacketed portion and a leader comprising coiled jacketed portion coupled to the unjacketed portion of the first optical fiber waveguide, and wherein the the leader is coiled inside and is disposed in contact with an inner wall of the housing;
a missile; and
a second balloon assisted dispenser coupled to the missile comprising a second optical fiber waveguide having an unjacketed portion and a leader comprising coiled jacketed portion coupled to the unjacketed portion of the second optical fiber waveguide, and wherein the the leader is coiled inside and is disposed in contact with an inner wall of the housing, and wherein the first and second optical fiber waveguides are coupled together.

8. The single pylon launcher of claim 7 wherein the first and second optical fiber waveguides are coupled together by means of a mating connector.

9. The single pylon launcher of claim 7 wherein the launcher has an L-shape and wherein the first balloon assisted dispenser is disposed adjacent an end of the L and is oriented in a direction substantially parallel to an orientation of the missile, and wherein the second balloon assisted dispenser is disposed in an aft end of the missile adjacent the first balloon assisted dispenser and is oriented in a direction substantially parallel to the orientation of the missile.

10. The single pylon launcher of claim 7 wherein the first balloon assisted dispenser is disposed adjacent an aft end of the launcher and is oriented generally orthogonal to an orientation of the missile, and wherein the second balloon assisted dispenser is disposed in an aft end of the missile adjacent the first balloon assisted dispenser and is oriented in a direction substantially parallel to the orientation of the missile.

11. The single pylon launcher of claim 7 wherein the first balloon assisted dispenser is disposed at a forward end of the launcher and is oriented orthogonal to an orientation of the missile, and wherein the second balloon assisted dispenser is disposed in a forward end of the missile proximate the first balloon assisted dispenser and is oriented in a direction orthogonal to the orientation of the missile and generally aligned with the first balloon assisted dispenser.

12. The single pylon launcher of claim 7 wherein the first balloon assisted dispenser is disposed adjacent an aft end of the launcher and is oriented in a direction generally parallel to an orientation of the missile, and wherein the second balloon assisted dispenser is disposed in a forward end of the missile and is oriented in a direction generally orthogonal to the orientation of the missile.

* * * * *